(12) United States Patent
Miliavisky et al.

(10) Patent No.: US 7,986,696 B1
(45) Date of Patent: Jul. 26, 2011

(54) METHOD AND APPARATUS FOR LONGEST PREFIX MATCHING

(75) Inventors: Vladimir Miliavisky, Petach Tikva (IL); Eyal Oren, Kfar Hess (IL); Vladimir Kolmanovitch, Netanya (IL); Alexander Zeltser, Netanya (IL); Michael Mesh, Kfar Saba (IL)

(73) Assignee: Compass Electro-Optical Systems, Natanya, IL (US)

( * ) Notice: Subject to any disclaimer, the term of this patent is extended or adjusted under 35 U.S.C. 154(b) by 221 days.

(21) Appl. No.: 12/369,792

(22) Filed: Feb. 12, 2009

(51) Int. Cl.
*H04L 12/56* (2006.01)
*G06F 13/00* (2006.01)

(52) U.S. Cl. ........................... 370/392; 711/108
(58) Field of Classification Search ............ 370/389, 370/391, 392, 400, 401; 711/108, 216
See application file for complete search history.

(56) References Cited

U.S. PATENT DOCUMENTS

| | | | |
|---|---|---|---|
| 7,054,993 B1 | 5/2006 | Srinivasan et al. | |
| 7,299,317 B1 | 11/2007 | Paniigrahy et al. | |
| 7,558,270 B1 * | 7/2009 | Wilford et al. | 370/395.42 |
| 7,565,482 B1 * | 7/2009 | Rangarajan et al. | 711/108 |
| 7,707,217 B2 * | 4/2010 | Allwright et al. | 707/758 |
| 2003/0005210 A1 * | 1/2003 | Thummalapally et al. | 711/1 |
| 2005/0083937 A1 | 4/2005 | Lim | |
| 2006/0262583 A1 | 11/2006 | Venkatachary | |
| 2007/0136331 A1 | 6/2007 | Hasan et al. | |
| 2007/0186036 A1 | 8/2007 | Bittner, Jr. | |
| 2008/0112413 A1 * | 5/2008 | Pong | 370/392 |
| 2009/0150603 A1 | 6/2009 | Sahni et al. | |

OTHER PUBLICATIONS

Wang P-C et al: "Efficient Entry-Reduction Algorithm for TCAM-Based IP Forwarding Engine" IEE Proceedings: Communications Institution of Electrical Engineers, GB vol. 152, No. 2 , Apr. 8, 2005, pp. 172-176, XP006023920, ISSN: 1350-2425, DOI: 10.1049/IP-COM; 20041153—Whole section 3.
Wei Lin et al: "A TCAM Index Scheme for IP Address Lookup" Communications and Networking in China 2006. Chinacom '2006 First International Conference on, IEEE, PI Oct. 1, 2006, pp. 1-5, XP031074707, ISBN: 978-1-4244-0462-9 Abstract Whole section 3.

* cited by examiner

*Primary Examiner* — Hassan Phillips
*Assistant Examiner* — Saba Tsegaye
(74) *Attorney, Agent, or Firm* — Deborah Gador

(57) ABSTRACT

A lookup table including stored data, the lookup table including a Random Access Memory (RAM) for storing the data, wherein the RAM includes a plurality of windows; and a Ternary Content Addressable Memory (TCAM) for storing indices, each index pointing to the windows, and a method for performing a Longest Prefix Match (LPM) including organizing data in such a lookup table, searching according to a lookup key in the TCAM, receiving a match signal from the TCAM including an index pointing to one of the windows, and searching according to the lookup key in the pointed to window.

16 Claims, 9 Drawing Sheets

METHOD AND APPARATUS FOR LONGEST PREFIX MATCHING

FIELD OF THE INVENTION

The present invention relates to a fast LPM (Longest Prefix Match) lookup, particularly for use for packet routing in packet switched networks.

BACKGROUND OF THE INVENTION

Longest Prefix Match (LPM) is a problem of finding the longest prefix among a number of prefixes stored in a data base that matches a given lookup key. LPM can be used in many applications and is not limited to IP routing, but since IP routing is one of the major LPM applications, the present invention will be discussed in a context of IP routing, by way of non-limiting example, only.

The growth of the Internet and the demand for increased bandwidth of networks has necessitated search capabilities that traditional RAMs (Random Access Memory) can barely meet. In a typical routing lookup operation, Internet routers look up the destination address of an incoming packet in its forwarding table to determine the packet's next hop on its way to the final destination. This operation is performed on each arriving packet by every router in the path that the packet takes from its source to the destination.

The adoption of Classless Inter-Domain Routing (CIDR) since 1993 means that a routing lookup operation requires performing a Longest Prefix Match (LPM), in which a match for the longest prefix with the lookup key is performed (wild card bits allowed), rather than a full match to every bit of the lookup key. A network processor, router, bridge, switch, or other network device performing similar routing lookup functions, maintains a set of destination address prefixes in a forwarding table, also known as a Forwarding Information Base (FIB). A FIB contains a set of prefixes with corresponding output interfaces indicating destination addresses. LPM is used in IPv4 and IPv6 routers to select the most appropriate entry in the routing/forwarding table, which indicates the proper output interface to which the input interface should send a packet to be transmitted by the router.

Given a packet, the Longest Prefix Match operation consists of finding the longest prefix in the FIB that matches the lookup key, for determining the destination of the packet to be transmitted by the router. The most commonly used lookup keys are the 32 bit address in Internet Protocol version 4 (IPv4), supporting an address space of $2^{32}$-about $10^9$ addresses, or the 128 bit address Internet Protocol version 6 (IPv6), supporting an address space of $2^{128}$-about $10^{39}$ addresses.

A FIB can be implemented based on Random Access Memories (RAMs). In this case, the FIB prefixes are held in one or more RAMs, and software or hardware which executes search algorithms, such as M-Trie, Bitmap Tree, etc. (which are typically tree based search algorithms) performs the LPM. In a RAM, information is stored and retrieved at a location determined by an address provided to the memory.

Another alternative for implementing a FIB is by using a fast hardware lookup device, such as a TCAM. In a CAM (Content Addressable Memory), a search datum is provided to the CAM and every location in the memory is compared to it in parallel. The CAM responds with either a "match" or "mismatch" signal and returns the address, the contents of which matched the search data. CAM performs exact (binary) match searches, while the more powerful Ternary CAM (TCAM) adds masking capabilities, by storing and searching a third "don't care" state, enabling pattern matching with the use of "don't care" states. "Don't care" states act as wildcards during a search, and are thus particularly attractive for implementing longest prefix matching (LPM).

TCAMs have been also used for speeding up the destination address search function and quality of service (QoS) lookup required by network routers. When using TCAMs for FIB implementation, the lookup time is constant and there is no search throughput performance penalty, as opposed to a performance penalty incurred when using RAMs for searching. On the other hand, TCAMs are substantially larger and more complex devices than RAMS and also dissipate significantly more power than RAMs, due to their parallel search capability. Another TCAM disadvantage is a lack of error correction protection (ECC or similar), which reduces the overall system availability, due to the higher probability of an incidence of a memory bit error, particularly as the size of utilized TCAM memory increases.

While advanced RAM based FIB implementations/algorithms are scalable in terms of the number of prefixes they can hold, they are not scalable from the lookup key width perspective, as the number of accesses to FIB memory depends on the lookup key width. In general, the wider the key, the more lookups are required, and since prefixes will occupy more than one RAM entry, an execution time penalty for searching, proportional to the key width, will result, due to the tree based algorithms used.

A TCAM based FIB, on the other hand, is not scalable in terms of number of prefixes, as it holds a fixed number of entries. The most advanced TCAM device known today has a capacity of 20 Mbit, which can be used to hold up to 0.5 M prefixes.

Accordingly, there is a long felt need for a system and method for performing a Longest Prefix Match (LPM) operation in a Forwarding Information Base (FIB), which would exploit the respective advantages of TCAMs and RAMs and overcome the respective shortcomings of TCAMs and RAMs, to achieve a scalable FIB organization including a flexible number of entries and a constant LPM lookup time, and it would be very desirable to implement wire-speed packet forwarding using such a system.

SUMMARY OF THE INVENTION

There is provided according to the present invention a lookup table (particularly a FIB) that is constructed as a combination of TCAM and RAM memories. This combination permits creation of lookup table with multi-million prefixes. There is also provided a method for a fast LPM (Longest Prefix Match) using that lookup table, wherein a lookup is performed in two steps, one TCAM access step plus one RAM access step. The lookup can be carried out in a pipeline fashion, by performing simultaneously, in one cycle, a key N lookup step in the RAM and an N+1 key lookup step in the TCAM.

According to a preferred embodiment, the lookup table is implemented by a dynamic and scalable method of continuously mapping prefix (or other data) entries into an array of multiple RAM pages or windows. Preferably, each window can be read in one cycle. Each such window is organized as an array of entries and each entry contains prefix data and a tag. All windows are organized such that, in each window, all entries or prefixes have a common prefix portion, herein called an "aggregation prefix", which is shorter than or of equal length to the entire prefix in the entry. It is a particular feature of the invention that the method, and the algorithm implementing it, is agnostic to the length of the key.

There is thus provided, according to the invention, a lookup table including stored data, the lookup table including a Random Access Memory (RAM) for storing the data, wherein the RAM includes a plurality of windows, and a Ternary Content Addressable Memory (TCAM) for storing indices, each index pointing to one of the windows.

According to a preferred embodiment, each window can be read in one cycle. Further according to a preferred embodiment, each window contains a plurality of entries, each entry containing at least a prefix field and a tag field.

There is also provided, according to the invention, a method for performing a Longest Prefix Match (LPM) including organizing data in a lookup table including a Random Access Memory (RAM) for storing the data, the RAM comprising a plurality of windows, and a Ternary Content Addressable Memory (TCAM) for storing indices, each index pointing to one of the windows, searching according to a lookup key in the TCAM, receiving a match signal from the TCAM including an index pointing to one of the windows, and searching according to the lookup key in the pointed to window.

According to a preferred embodiment, the step of organizing includes organizing the data in the windows into entries, each entry containing at least a prefix and a tag, and the method further includes reading all entries of one of the windows in parallel, generating a masked lookup key for each entry by masking each of the lookup key's least significant bits according to the entry's tag value, comparing each entry's prefix to the masked key to identify a match, selecting an entry with a largest tag value, when more than one entry provides a positive result, and providing an index of the selected matching entry in case of a match.

Further according to a preferred embodiment, the steps of searching in the TCAM of a present lookup key and searching the RAM for a previous lookup key are performed simultaneously in one cycle.

BRIEF DESCRIPTION OF THE DRAWINGS

The present invention will be further understood and appreciated from the following detailed description taken in conjunction with the drawings in which.

DETAILED DESCRIPTION OF THE INVENTION

The present invention relates to a novel construction of a lookup table, described herein, by way of example only, as a Forwarding Information Base (FIB), and a dynamic and scalable method for performing a Longest Prefix Match (LPM) operation in that lookup table, particularly for use in routing applications. The lookup table according to the invention is organized as a combination of TCAM and RAM memories, while the method for LPM lookup is performed in two steps, one TCAM access step plus one RAM access step. In this way, the combination RAM/TCAM lookup table implementation achieves a scalable lookup table organization including a flexible number of prefixes and a constant LPM lookup time. In a FIB, this organization overcomes the search throughput penalty of a RAM-based FIB, and the non scalability restriction of a TCAM based FIB. It should be noted that, using currently available technology, the number of required TCAM entries for such FIB organization can be 2-3 orders of magnitude lower than the number of required TCAM entries when only TCAM is used for FIB implementation. Any unused TCAM entries can be used for additional classification/lookup features or to scale up the FIB functionality. This also improves system availability due to reduced usage of unprotected TCAM memory.

Figure 1:
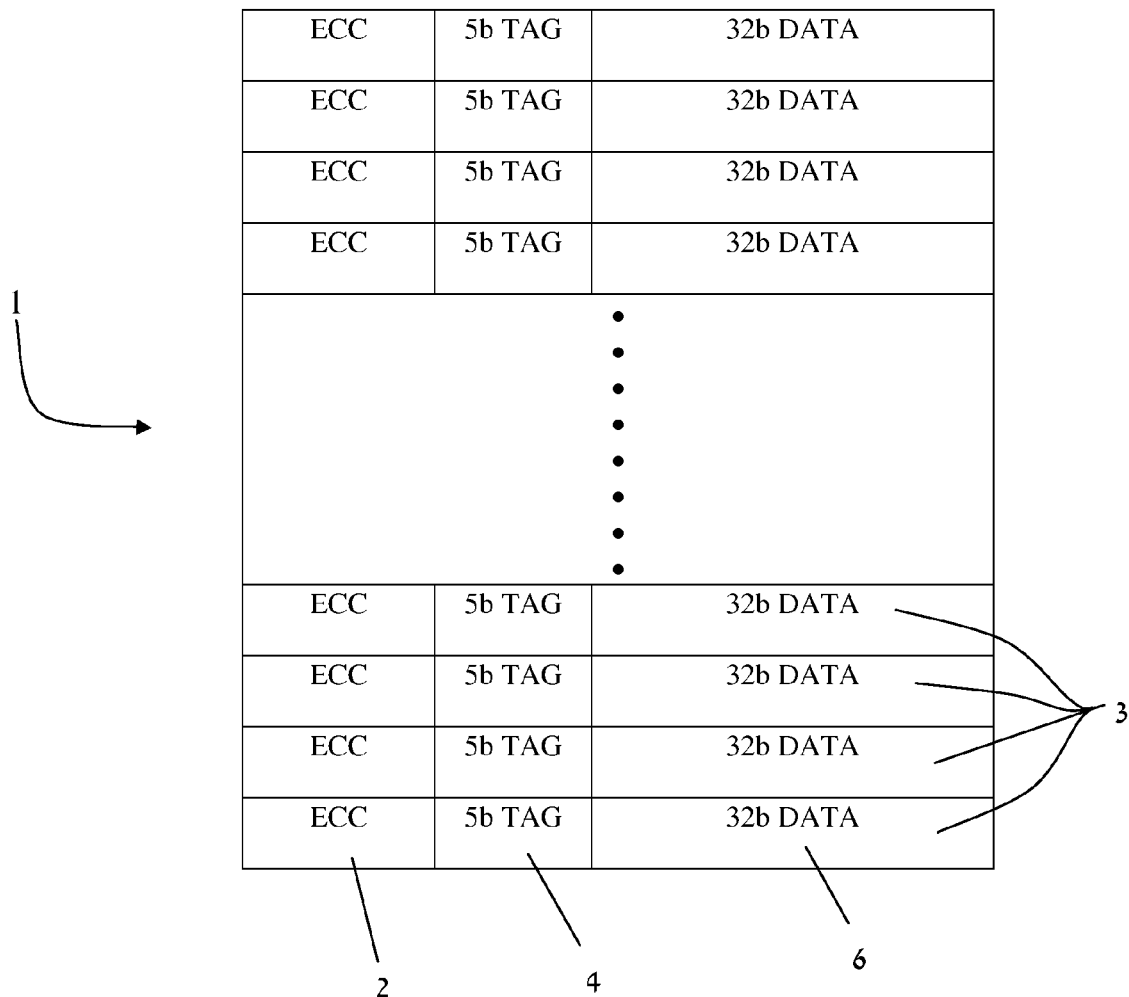
FIG. 1 is a schematic illustration of an organization of a RAM window in a lookup table, here illustrated as a Forwarding Information Base (FIB), constructed and operative in accordance with one embodiment of the present invention.

According to a preferred embodiment of the invention, the RAM is divided into many pages or windows, where each window is searched, as a whole, for a match. Preferably, each window can be read in one cycle. A schematic illustration of the organization of one example of a RAM window, according to one embodiment of the present invention, is shown in FIG. 1. In this example, RAM window 1 is organized as an array of entries 3. Each entry 3 in the illustrated embodiment includes a prefix field 6 and a tag field 4, indicating the number of valid Most Significant Bits (MSB) in the prefix field. The prefix and tag sizes can vary in different windows. The windows are preferably organized such that, in each window, all entries have a prefix field with an identical number of most significant bits, herein called an aggregation prefix. The aggregation prefixes are inserted into a TCAM in a non-ascending order of their prefix lengths, each pointing to the corresponding RAM window. It will be appreciated that the non-ascending order ensures correct operation of the LPM, as the TCAM lookup returns the index of the first TCAM entry matching the lookup key and, thus, the one with the longest prefix.

Each entry 3 may further include an optional memory protection field 2, such as Error Correction Code (ECC). If desired, the memory can be protected by any other protection scheme.

The plurality of windows can be implemented, for example, by putting multiple embedded RAM blocks, such as DRAM memory blocks, on-chip, and reading these RAM blocks in parallel. Since the width of the windows that are stored in RAM exceeds the word width of a single RAM block, each window is stored in multiple RAM blocks, where each of those RAM blocks contains part of the window information. Reading one window will thus require reading, in parallel, all the RAM blocks where the data of that window are stored.

Figure 2:
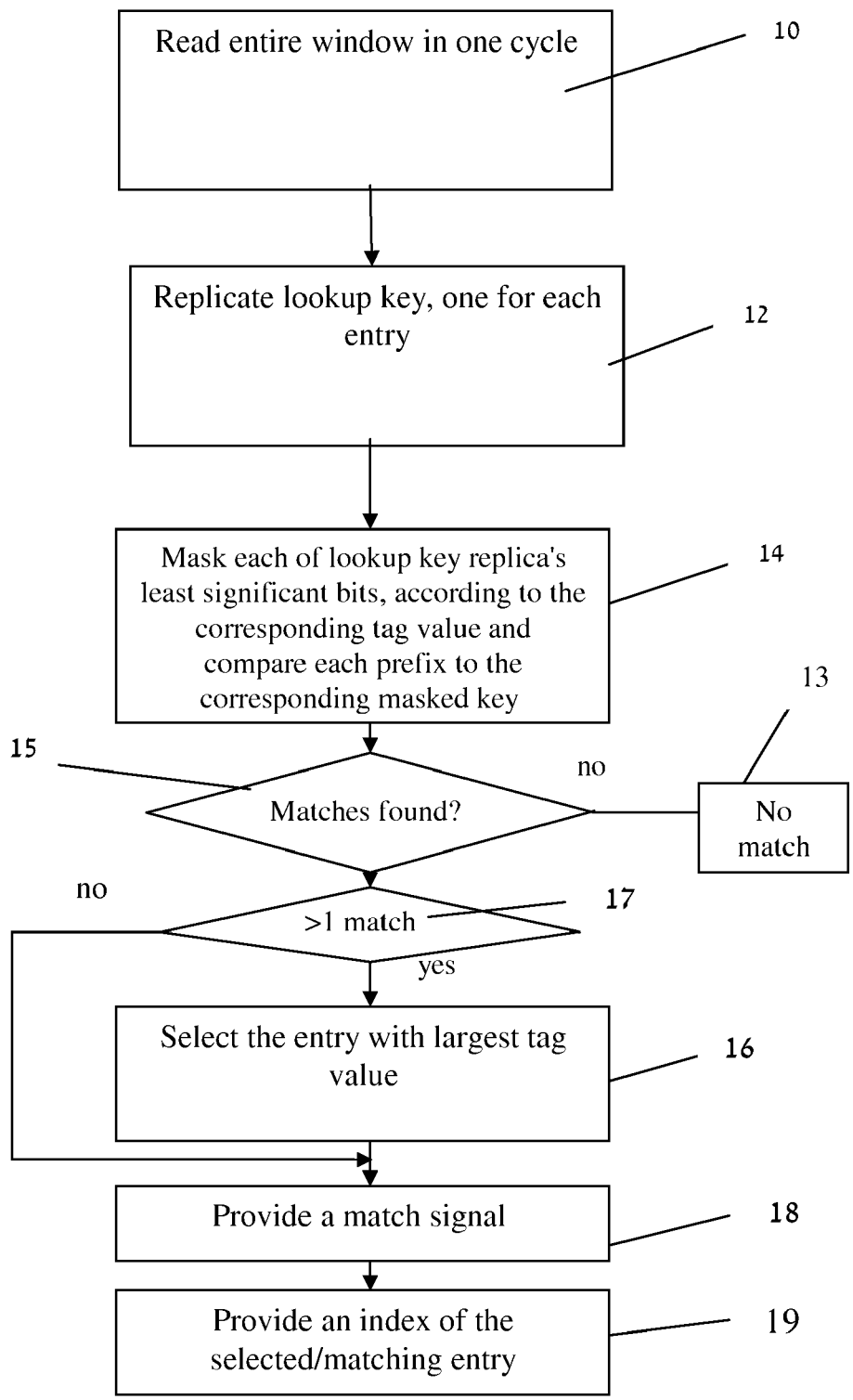
FIG. 2 is a flow chart illustrating the lookup flow in a RAM window according to one embodiment of the invention.

A lookup in the window of FIG. 1 for a particular lookup key, according to an exemplary embodiment of the invention, is carried out according to the flow chart in FIG. 2. The entire window (i.e., tags 4 and prefixes 6) is read, preferably in one cycle, as by hardware logic (block 10). The hardware logic performs a replication of the lookup key, so as to provide one replica for each entry 3 in the window (block 12). During comparison, only the most significant bits of each of the lookup key replicas, represented by the value of tag 4, will be compared, and all the other bits of each replica are masked (block 14). For example, if the lookup key is 10.10.10.10 and the tag value is 16, then the key value for purposes of the LPM lookup, after the masking operation, is 10.10.*.*. This operation is carried out during a single cycle (i.e, fixed time period), and is not dependent on the number of replications (i.e., the number of entries).

Each prefix is compared (block 14), as by the hardware logic, to the corresponding masked key, to determine whether there is a match (block 15). If no match is found, a signal is sent indicating no match (block 13) and no data is read from the DRAM. When there is a miss indication, the rest of the result is "don't care". According to a preferred embodiment, the database is built in such a way that no miss is possible (i.e., there is always a default (0.0.0.0/0 or default gateway) in the database). All the entries of a single window are read and searched in parallel. Subsequently, in the next cycle, another window, which belongs to the next lookup operation, is read and searched.

If a match is found, wherein the prefix and the masked key are equal, it is determined whether more than one match was uncovered (block 16). When more than one entry provides a positive result, the entry with the largest tag value is selected (block 17). The result of the lookup is provided (block 18), and the entry index of the best match uncovered in the lookup (i.e., the memory address of the entry in which a match was indicated) is also provided (block 19). In other words, a hit indication plus the result read from the corresponding DRAM location are output.

It should be noted that the result of such a RAM organization is the performance, in parallel, of an order independent, longest prefix match on multiple entries in one window. It will be appreciated that entry placement in a window is order independent, so new entry inserting is order independent, as well. Order independence simplifies the lookup table management and decreases the typical lookup table entry insert time.

Figure 3:
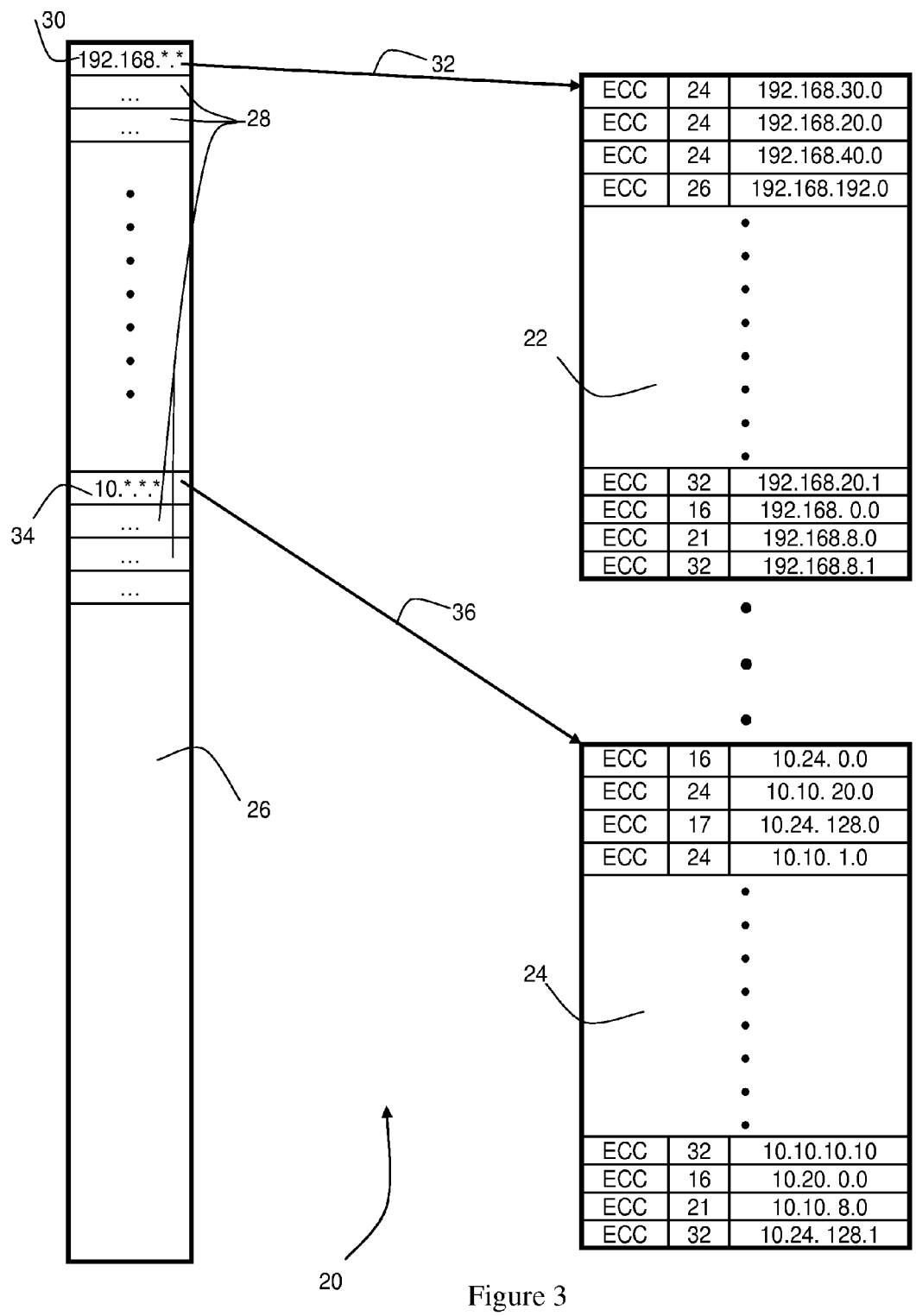
FIG. 3 is a schematic illustration of a lookup table (FIB) organization according to one embodiment of the invention.

An example of the organization of a FIB 20, according to a preferred embodiment of the invention, is shown in FIG. 3. FIB 20 includes a plurality of RAM windows, only two of which are shown, for ease of understanding. RAM window 22 contains, in all its entries, values in prefix field 6 of 192.168.*.*. In other words, the 16 most significant bits of all the prefixes in window 22 have an identical value of 192.168, while the remaining bits (least significant bits) contain values which differ from one another. Thus, in window 22, the aggregation prefix is 16 bits long. Similarly, RAM window 24 contains, in all its entries, prefix values of 10.*.*.*, wherein the 8 most significant bits of the prefix fields in all entries have an identical value of 10, and the 24 least significant bits contain other values. Thus, the aggregation prefix of RAM window 24 is 10.

FIB 20 further includes a TCAM 26, having a plurality of entries 28, each consisting of an aggregation prefix and an index pointing to the RAM window in which all the entries have that aggregation prefix. Thus, one entry 30 contains the aggregation prefix value 192.168 and an index 32, pointing to RAM window 22, in which all entries have an aggregation prefix of 192.168. The second exemplary entry 34 contains the aggregation prefix value 10. and an index 36, pointing to RAM window 24, in which all entries have the common aggregation prefix value of 10.

Figure 4:
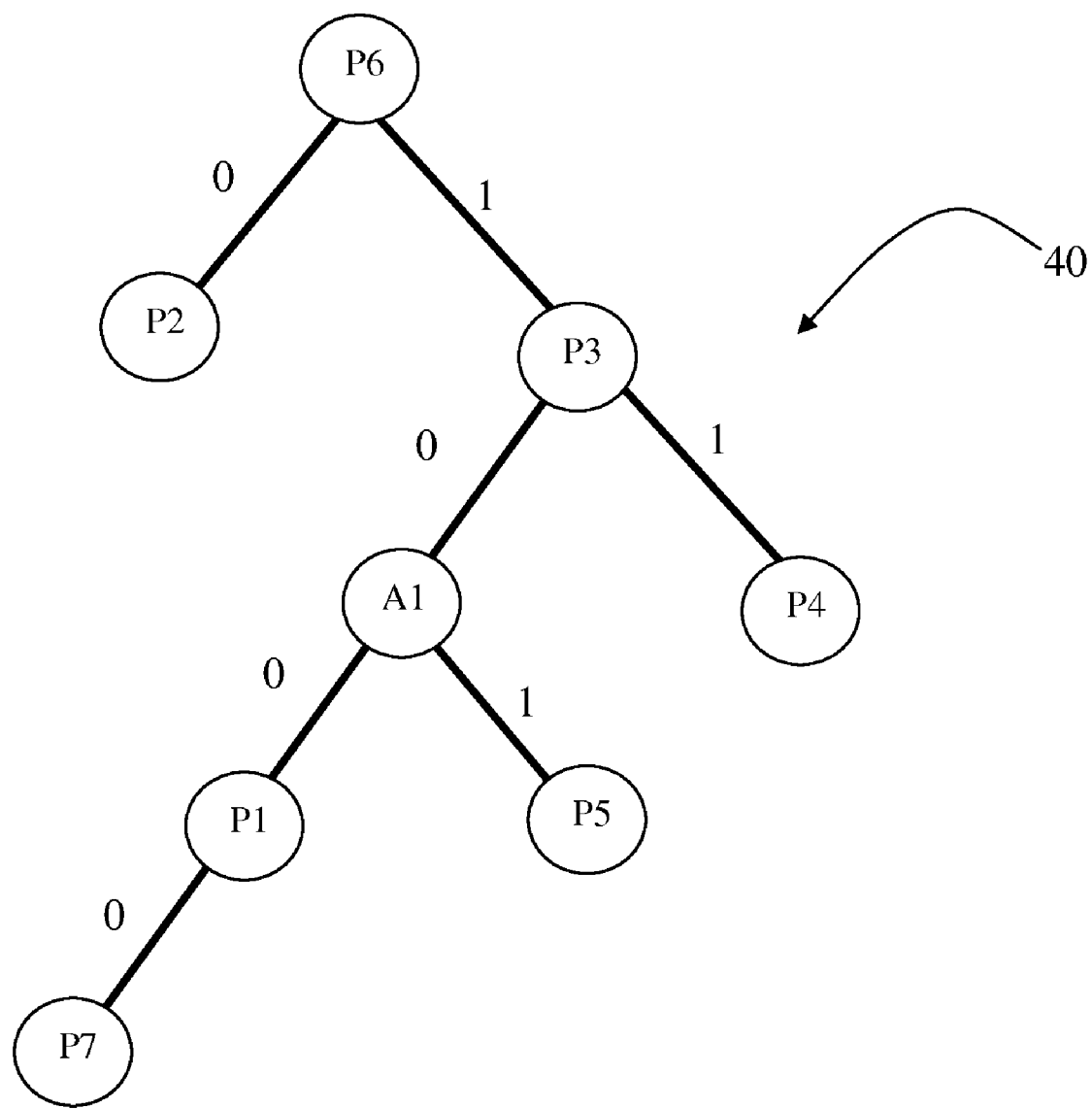
FIG. 4 is an illustration of an exemplary unibit trie.

The principle of the FIB organization and the distribution of the prefixes into a number of windows, as described above, are based, in the illustrated example, on a unibit trie organization. Distribution of prefixes into a number of windows is illustrated in FIG. 4. The database of prefixes arranged and stored in the FIB is organized as a unibit trie 40. The following prefix database will be used as an example. The prefixes are represented by a binary notation 0, 1 and * (don't care):

P1=100*
P2=0*
P3=1*
P4=11*
P5=101*
P6=*(Default Gate Way)
P7=1000*

Each node in the corresponding unibit trie 40 can represent a real prefix (i.e., one of the prefixes listed above (e.g. P1, P2, etc.)) or a pseudo prefix (which has no associated prefix). P6 is selected as the root, because it has a *, or don't care, value. The sequence of building the tree for the given list of prefixes is as follows: The Most Significant Bit (MSB) of the prefix is checked. In the case of P2 and P3, where the prefix length is one, the MSB is the only bit. If the MSB has a value of "0", prefix P2 is indicated, and if it has a value of "1", prefix P3 is indicated. Since there are no other prefixes in this example which have a MSB bit of "0" value, P2 is a leaf node in this tree.

For longer prefixes, the bit next to the MSB (bit 2) is checked next. For P4 (P4="11") this bit value is "1". There are no other prefixes in this example whose two most significant bits have a "11" value, and thus, P4 is also a leaf node in this tree. Since there is no prefix in this example having a "10" value, but there are longer prefixes with "10" value as their first two MSB bits, the node representing "10" is indicated in the example tree as a pseudo node A1 (i.e., not a real prefix), and the third bit is checked. For bit 3 equals "1", prefix P5 (P5="101") is indicated in the tree as a leaf node (there are no other prefixes with "101" as their first 3 bits value). For bit 3 equals "0", prefix P1 (P1="100") is designated. Subsequently P7 (P7="1000") is indicated, if bit 4 equals "0".

For arranging data in the FIB of the present invention, unibit trie 40 is divided into a number of sub-trees. A weight (W) for each sub-tree is defined as the number of real prefix nodes (excluding pseudo nodes), that are included in this sub-tree. For example, the weight of a sub-tree whose root is P6 is W(P6)=7 (the entire tree 40, in this example); similarly the weight of a sub-tree whose root is P2 is W(P2)=1 (only P2); while the weight of a sub-tree whose root is P3 is W(P3)=5 (including nodes P3,P4,P1,P5,P7).

In order to distribute the prefixes into a number of windows, the tree is split into a number of sub-trees, while keeping the weight (W) of each sub-tree root node less than the window size. The tree can be split by a number of heuristic methods. One exemplary method is illustrated by the flow chart in FIG. 5.

First, a root of the prefix tree is selected (block 50).

The tree is traversed downward (block 52), starting from the tree root, selecting the child node with the largest weight at each node. If this child node has a weight (W) which is more than the window size (WS) (block 54), the traversing of the tree continues (block 56).

When the first node N having a weight (W) which is less than the window size (WS) is reached, the tree is split (block 58), forming a sub-tree rooted at node N, and it is determined whether node N is a real node (block 60). If N is a real node, the sub-tree real prefixes are written into a RAM window.

If N is not a real prefix node, an entry with zero length prefix is written into the RAM window pointing to the same lookup result as N's closest parent that represents a real prefix (block 64). Such an entry is called a backtracking pointer.

The aggregation prefix of N (either real or not) is then written into the TCAM, pointing to the corresponding RAM window (block 62). The aggregation prefixes are inserted into the TCAM in a non-ascending order of their prefix lengths, each pointing to the corresponding RAM window.

If, after splitting the above sub-tree, the main tree still has a number of nodes greater than the window size, the process of splitting the tree reiterates from traversing the tree (block 52), starting at the same root and calculating the new weights of the various child nodes, as the remaining tree has changed. After the entire tree has been split, the number of real prefixes in the remaining tree is less than the window size, so it can be written into a RAM window (block 62) and a TCAM window (block 64), like the sub-trees described above.

Figure 5:
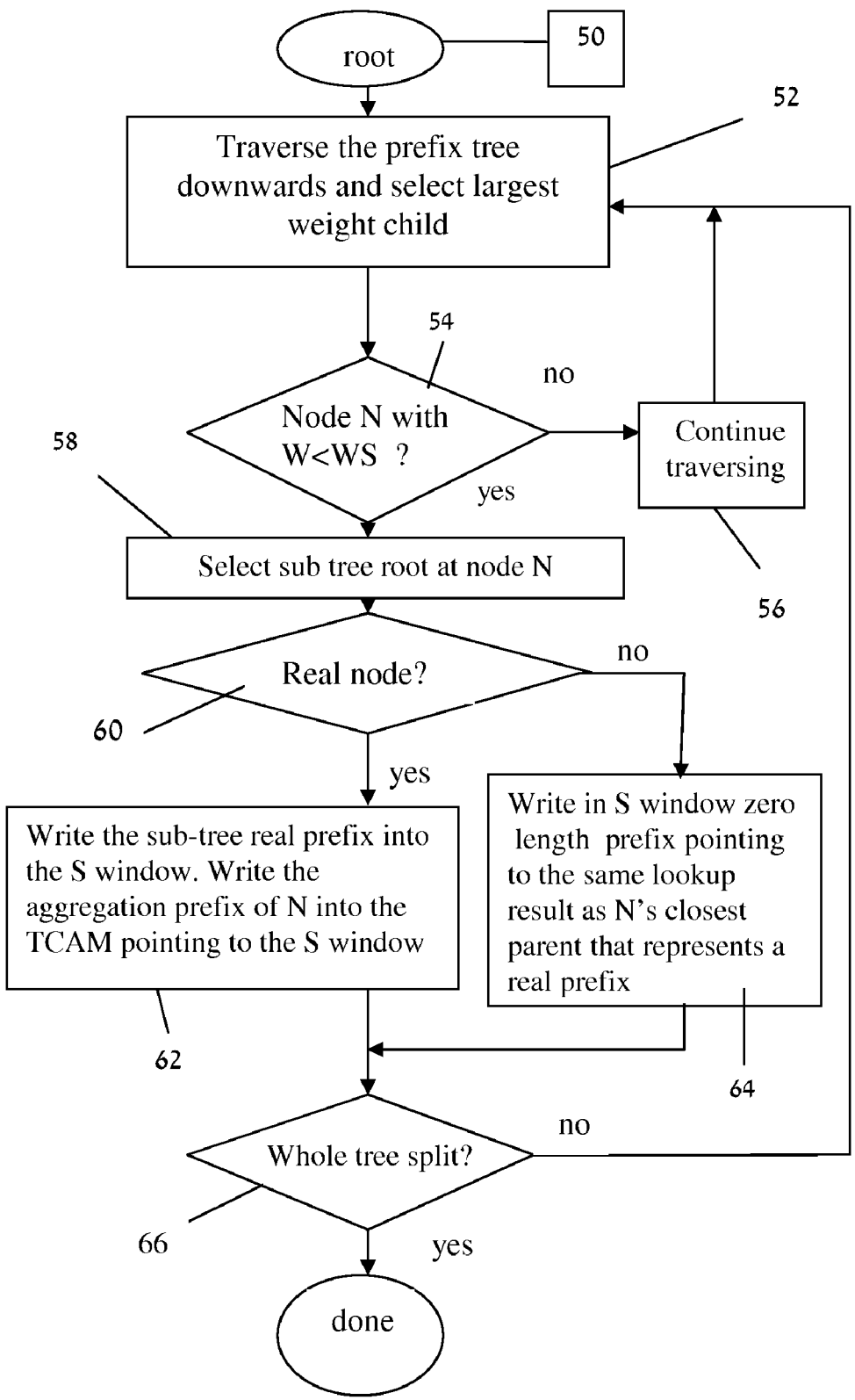
FIG. 5 is a flow chart illustrating a method for splitting a prefix tree, according to one embodiment of the invention.
Figure 6:
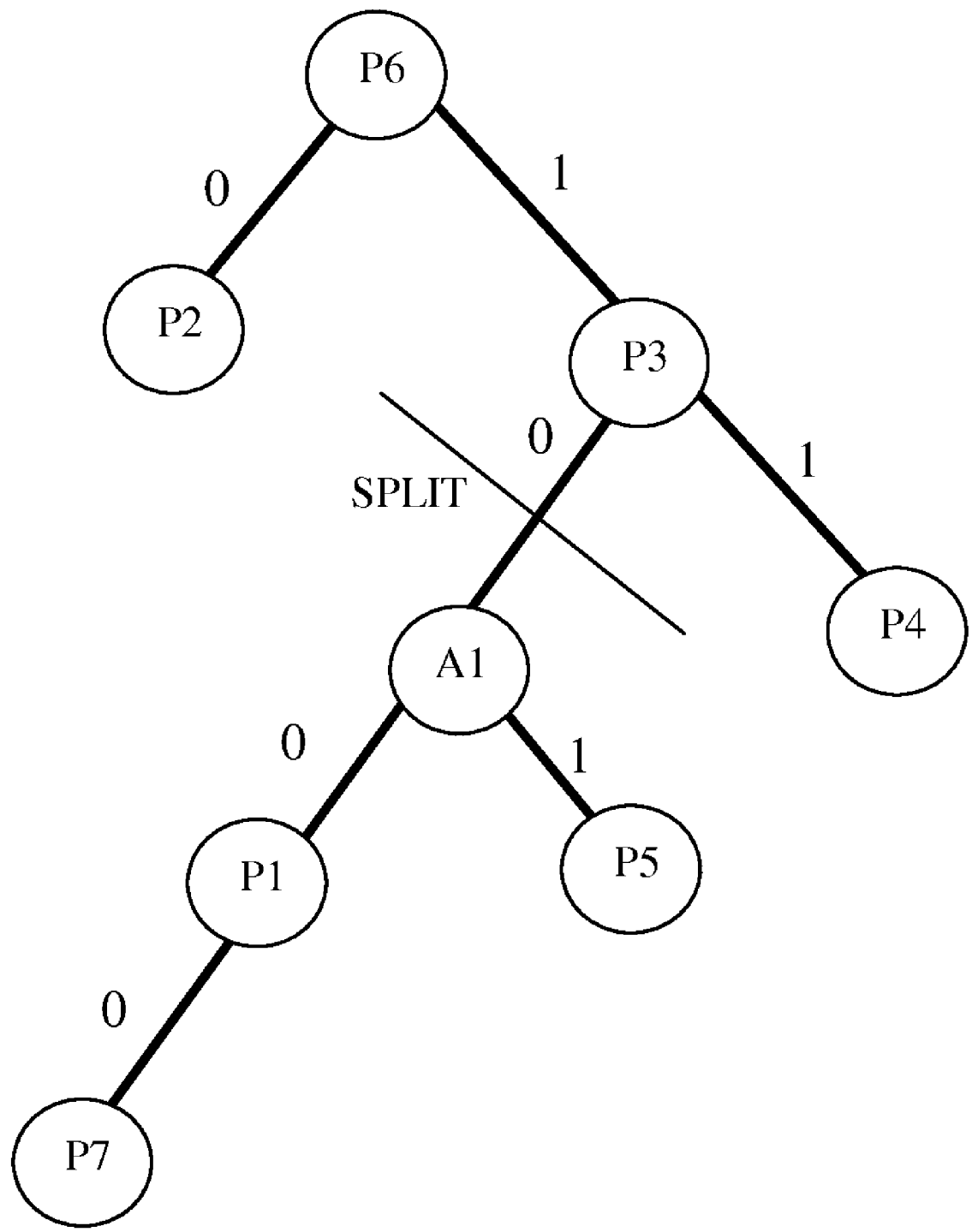
FIG. 6 is an illustration of a split in the unibit trie of FIG. 4, according to one embodiment of the invention.
Figure 7:
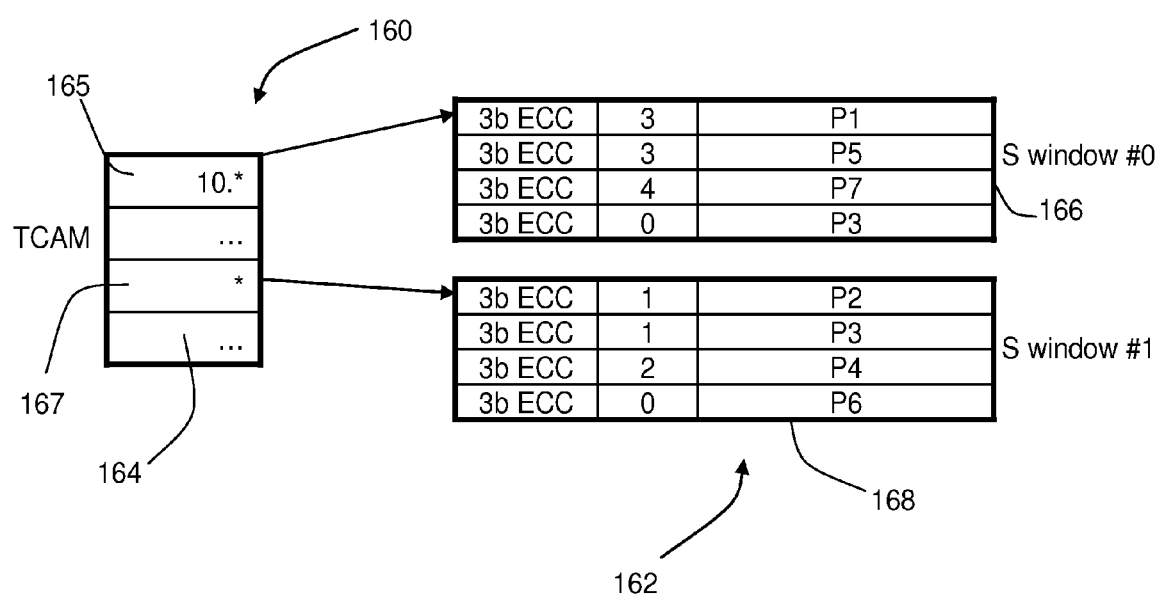
FIG. 7 is a schematic illustration of an exemplary lookup table (FIB) organization based on the unibit trie of FIG. 4, according to one embodiment of the invention.

For a window size of WS=4, one possible split according to this invention is illustrated in FIG. 6 and the corresponding FIB 160 is shown in FIG. 7, according to the method illustrated in FIG. 5. Starting at root P6, the tree is traversed. At node P6, the child with the highest weight is P3. Since P3 has a weight greater than the window size, traversing continues. At P3, A1 is the child with the highest weight. Since the weight (W) of A1 is less than the window size (WS=4), the tree is split above node A1, creating two sub trees, one with a root at P6 and the other with a root at A1. It will be appreciated that, due to the size of this exemplary tree, no further splits are required.

The respective representation of this tree in a RAM 162 (having a window size of 4) and a TCAM 164 of the FIB 160 is shown in FIG. 7. FIB 160 includes two RAM windows 166, 168 of size WS=4. Window 166 stores the prefixes of the sub-tree whose root is P6, while window 168 stores the prefixes of the sub-tree whose root is A1. These prefixes may be inserted into the respective RAM windows in any arbitrary order.

Window 166 includes the four prefixes (P1, P5, P7, P3) with the aggregation prefix of 10*. It will be appreciated that, since A1 is merely a pseudo node (which does not represent a real prefix), a zero-length prefix is inserted into window 168 pointing to P3, since P3 is A1's closest parent that represents a real prefix, as shown in FIG. 6. Window 168 includes the four prefixes (P2, P3, P4, P6) with the aggregation prefix of *.

The two aggregation prefixes are written in the TCAM 164, aggregation prefix 165 10* pointing to window 166 and aggregation prefix 167* pointing to window 168.

Figure 8:
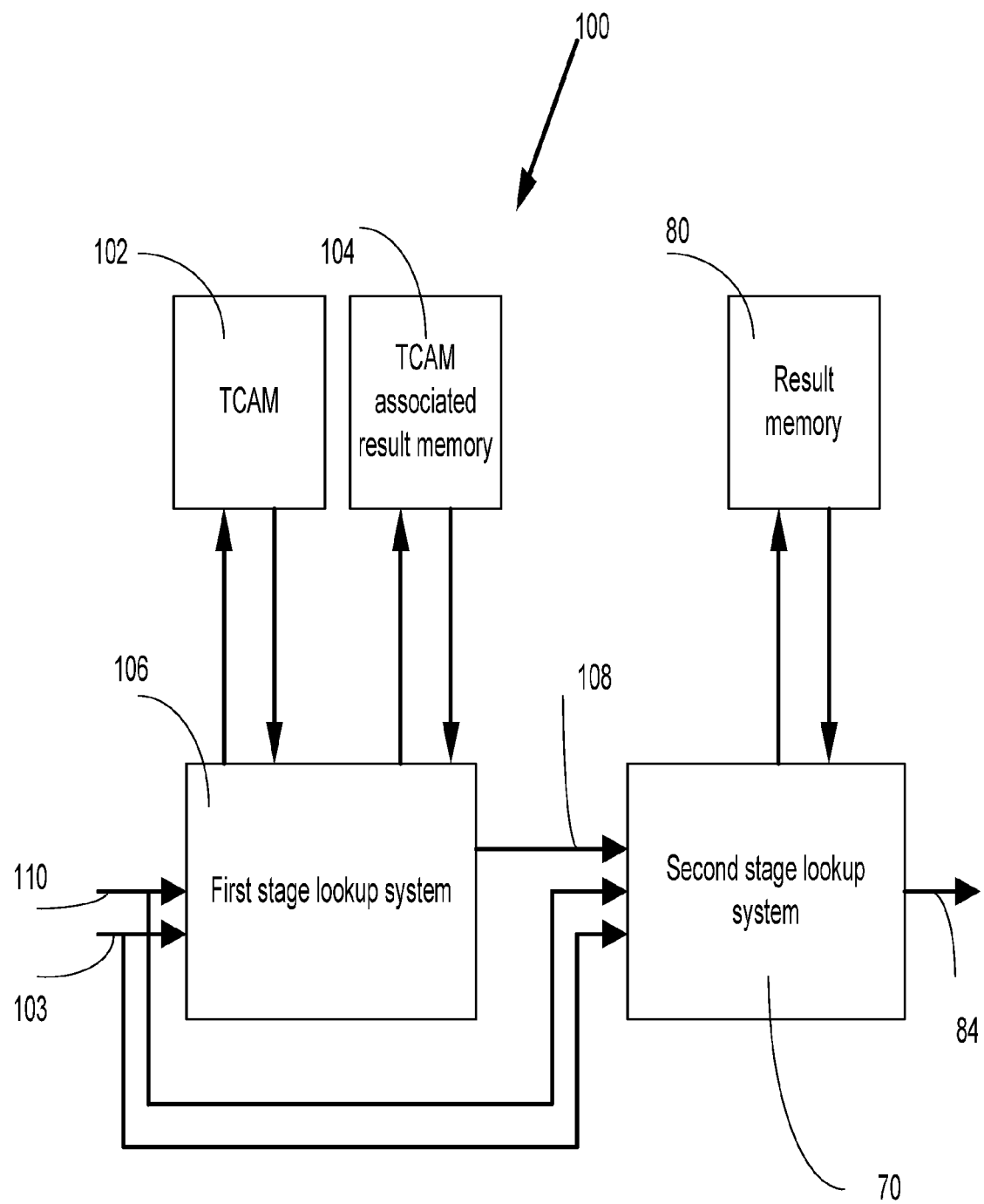
FIG. 8 is a block diagram of a system for performing LPM, constructed and operative in accordance with one embodiment of the present invention.

A block diagram of a system 100 for performing a Longest Prefix Match, constructed and operative according to one embodiment of the invention, is illustrated in FIG. 8. LPM system 100 includes a first stage (TCAM) lookup logic 106 coupled to a TCAM 102, that contains a plurality of aggregation prefixes and associated indices, as described above, a TCAM associated result memory 104 and a lookup result interface 108 for outputting lookup results. A second stage (RAM) lookup logic 70 (described in detail in FIG. 9, below) is coupled to a longest match result memory 80, implemented in DRAM in one embodiment of the invention, for storing results of the Longest Prefix Match search. Result memory 80 contains the results associated with each window entry. One result for each entry is located at a predetermined RAM location.

Second stage lookup logic 70 is also coupled to a lookup key and window ID 72 interface for receiving lookup keys and associated window IDs from first stage lookup logic 106 output via lookup result interface 108. First stage lookup logic 106 includes an input interface 110 for receiving lookup keys and a control interface 103 for receiving control lines for programming the logic and writing in the database from a host system (not shown), which may be a host CPU or another proprietary block.

Figure 9:
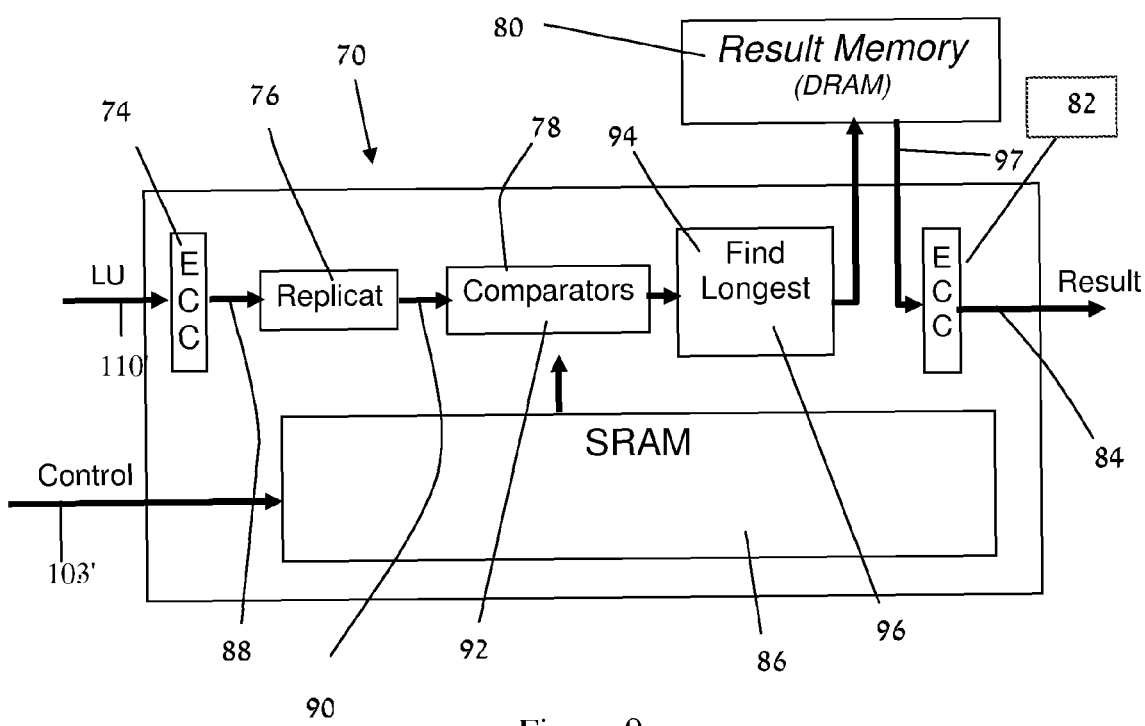
FIG. 9 is a block diagram of a system for performing the second stage lookup in a system for performing LPM, constructed and operative in accordance with one embodiment of the present invention.

Referring now to FIG. 9, as stated above, second stage lookup logic 70 includes lookup key interface 72 for receiving input lookup keys and associated window IDs. Lookup key interface 110' is coupled to an ECC protection block 74 which, in turn, is coupled to a replicator 76 for replicating the lookup key. Replicator 76 is coupled to comparison means 78, which is also coupled to a database or memory 86 to be searched, i.e., any Random Access Memory, here illustrated, by way of example only, as an SRAM.

Memory 86 contains all the windows holding the database, from which one window is accessed at a time. Second state lookup logic 70 also includes control lines 103', arranged for programming the logic and writing in the database to control memory 86. Comparison means 78 is arranged to provide signals indicating matches to a module 94 for selecting the longest of the matches and outputting the corresponding result data to a result memory 80, preferably a DRAM. Result memory 80 is coupled to an output interface 84, preferably via a further ECC block 82, providing a protected output result.

Operation of this system is as follows: An exemplary lookup key (LU) is input to first stage lookup logic 106 via lookup key interface 110. Logic 106 searches in TCAM 102 for the first aggregation prefix entry matching lookup key LU and returns a miss or match indication together with a window ID index where a match was found. TCAM matching results are also stored in TCAM associated result memory 104. The exemplary lookup key LU and window ID are output via output interface 108 and input into the second stage lookup logic 70 via interface 72. The ECC block 74 performs error detection and correction on the lookup key, for example, based on an ECC section in the lookup key, and outputs a corrected lookup key. One entire window, located in the SRAM 86, is read, preferably in one cycle, and input to the comparator 78. Replicator 76 replicates the lookup key outputting a plurality of replicas 90 of the lookup key.

Each prefix in the window read from the SRAM 86 is compared by comparator 78 to an associated lookup key replica output by replicator 76, after a number of the replica's least significant bits, according to the tag value of the corresponding window, have been masked, and the comparator outputs a result. A positive result signal including the index of the appropriate entry is provided by comparator 78 if it finds a match, whereby a prefix and the masked key are equal. A negative result signal is output if no match is found.

When more than one prefix provides a positive result, the prefix with the largest tag value (i.e., longest prefix) is selected by module 94 which outputs an address 96 for accessing the result memory 80.

The result memory 80, here illustrated by way of example as a DRAM, is preloaded by the host CPU and contains a database corresponding to memory 86—for each entry entered in the memory window, a corresponding entry is entered in the result memory 80. When a match is found, the location of the result block in memory 80 can be calculated therefrom. Result memory 80 provides a result 97 for address 96, which preferably is checked by ECC block 98, providing the final result 84. When using the FIB of the present invention in a router, the result is a data block describing where the packet with the given destination address (lookup key) matching the FIB prefix should be sent to.

It will be appreciated that the lookup can be carried out in a pipeline fashion, by performing simultaneously, in one cycle, a key N lookup step in the RAM and an N+1 key lookup step in the TCAM.

While the invention has been described with respect to a limited number of embodiments, it will be appreciated that many variations, modifications and other applications of the invention may be made. It will further be appreciated that the The invention is not limited to what has been described hereinabove merely by way of example. Rather, the invention is limited solely by the claims which follow.

The invention claimed is:

1. A lookup table including stored data, the lookup table comprising:
   data including prefixes organized in a tree structure;
   at least one Random Access Memory (RAM) for storing the data;
   wherein said RAM includes a plurality of windows searchable in one cycle, a number of real prefixes in each window being less than a fixed number of entries that can be stored in said window; and
   a single Ternary Content Addressable Memory (TCAM) for storing aggregation prefixes in a non-ascending order of their prefix lengths and an index of each said aggregation prefix, each index pointing to one of said RAM windows.

2. The lookup table according to claim 1, wherein each window has said fixed number of entries and can be read and dynamically mapped in one cycle.

3. The lookup table according to claim 2, wherein each window contains a plurality of entries, each entry containing at least a prefix field and a tag field.

4. The lookup table according to claim 3, wherein said prefix field and tag field have sizes that vary in different windows.

5. The lookup table according to claim 1, wherein the lookup table entries are protected by a protection scheme.

6. The lookup table according to claim 1, wherein said RAM is implemented by multiple embedded RAM blocks, wherein each RAM block contains a part of the window information.

7. The lookup table according to claim 1 wherein said RAM is implemented as on-chip RAM memories.

8. The lookup table according to claim 1, wherein said RAM is arranged for random access per window for reading to comparators, and for content access inside each said window for writing.

9. A method for performing a Longest Prefix Match (LPM) comprising:
   organizing data in a lookup table including
      storing the data in a Random Access Memory (RAM);
      said RAM comprising a plurality of windows, each said window capable of storing a fixed number of entries; and
   inserting aggregation prefixes having indices in a Ternary Content Addressable Memory (TCAM) in a non-ascending order of their prefix lengths, each index pointing to one of said windows;
   where said step of organizing data comprises:
      organizing lookup table prefixes in a binary tree structure
   splitting the Prefix tree into a number of Prefix sub-trees where each sub-tree consists of a number of real prefixes less than said fixed number of entries in a corresponding window, said real prefixes having a common aggregation prefix; searching for a matching prefix according to a lookup key in said TCAM;
   receiving a match signal from said TCAM including an index pointing to one of said RAM windows; and
   searching according to said lookup key in said pointed to window in one cycle.

10. The method according to claim 9, wherein said steps of searching in the said TCAM of a present lookup key and searching the RAM for a previous lookup key are performed simultaneously in one cycle.

11. The method according to claim 9, wherein said prefix tree is split into prefix sub-trees by
   traversing said tree from a root node;
   selecting, at each node, a child node having a largest weight, wherein a weight is the number of nodes on a tree having that root, and splitting the tree to form a sub-tree at a first node having a weight less than a window size of said RAM;
   writing the sub-tree real prefixes into one of said RAM windows in which all entries have a prefix field with an identical number of most significant bits
   writing an entry with zero prefix into one of said RAM windows, if a sub tree node (or aggregating prefix) is not a real prefix, pointing to the same lookup result as the closest parent that represents a real prefix called herein backtracking pointer
   writing the aggregation prefixes into a TCAM, each entry pointing to the corresponding RAM window having prefixes with the same aggregation prefix.

12. The method according to claim 9, wherein said RAM is arranged for random parallel access per window for reading to comparators, and for content access inside each said window for writing.

13. A method for performing a Longest Prefix Match (LPM) comprising:
   organizing data in a lookup table including
      a Random Access Memory (RAM) for storing the data;
      said RAM comprising a plurality of windows; and
      a Ternary Content Addressable Memory (TCAM) for storing aggregating prefixes and associated indices, each index pointing to one of said windows;
   searching according to a lookup key in said TCAM;
   receiving a match signal from said TCAM including an index pointing to one of said windows; and
   searching according to said lookup key in said pointed to window;
   wherein said step of organizing includes organizing said data in said windows into entries, each entry containing at least a prefix and a tag;
   further comprising
   reading all entries of one of said windows in parallel;
   generating a masked lookup key for each entry by masking each of the lookup key's least significant bits according to the entry's tag value;
   comparing each entry's prefix to said masked key to identify a match;
   selecting an entry with a largest tag value, when more than one entry provides a positive result; and
   providing an index of the selected matching entry in case of a match.

14. The method according to claim 13, wherein said step of organizing data in a lookup table comprises:
   organizing the prefixes in a tree structure;
   splitting the Prefix tree into a number of Prefix sub-trees where each sub-tree consists of a number of real prefixes less than a number of entries in a corresponding window.

15. The method according to claim 14, wherein said Prefix tree is split into prefix sub-trees by
   traversing said tree from a root node;
   selecting, at each node, a child node having a largest weight, wherein a weight is the number of nodes representing lookup table entries (real prefixes) on a tree having that child node as root, and splitting the tree to form a sub-tree at a first node having a weight less than a window size of said RAM;

writing the sub-tree real prefixes into one of said RAM windows in which all entries have a prefix field with an identical number of most significant bits writing an entry with zero prefix into one of said RAM windows, if a sub tree node is not a real prefix, pointing to the same lookup result as the closest parent that represents a real prefix called herein backtracking pointer writing the aggregation prefixes is into said TCAK each entry pointing to the corresponding RAM window having prefixes with the same aggregation prefix.

16. A method according to claim 15, wherein said step of writing aggregation prefixes includes inserting the aggregation prefixes into said TCAM in a non-ascending order of their prefix lengths.

* * * * *